Feb. 7, 1961 R. R. RACINE 2,970,862
SAFETY VEHICLE SEAT MECHANISM
Filed April 22, 1959 4 Sheets-Sheet 1

INVENTOR.
ROGER R. RACINE
BY
Bean, Brooks, Buckley & Bean
ATTORNEYS

Feb. 7, 1961 R. R. RACINE 2,970,862
SAFETY VEHICLE SEAT MECHANISM
Filed April 22, 1959 4 Sheets-Sheet 2

INVENTOR.
ROGER R. RACINE
BY
Bean, Brooks, Buckley & Bean
ATTORNEYS

Feb. 7, 1961 R. R. RACINE 2,970,862
SAFETY VEHICLE SEAT MECHANISM
Filed April 22, 1959 4 Sheets-Sheet 3

INVENTOR.
ROGER R. RACINE
BY
Bean, Brooks, Buckley & Bean
ATTORNEYS

Feb. 7, 1961 R. R. RACINE 2,970,862
SAFETY VEHICLE SEAT MECHANISM
Filed April 22, 1959 4 Sheets-Sheet 4

INVENTOR.
ROGER R. RACINE
BY
Bean, Brooks, Buckley & Bean
ATTORNEYS 2,970,862
Patented Feb. 7, 1961

2,970,862

SAFETY VEHICLE SEAT MECHANISM

Roger R. Racine, Tonawanda, N.Y., assignor to Protect-O-Matic Corporation, Tonawanda, N.Y.

Filed Apr. 22, 1959, Ser. No. 808,198

5 Claims. (Cl. 296—65)

This invention relates to automotive vehicles and particularly to automotive seat actuating mechanism which is adapted to protect occupants of the vehicle against injury upon collision or impact of the vehicle against another vehicle or a stationary object.

It is well known that personal injuries in the case of front end collisions of automotive vehicles are due mainly to the occupants being thrown forwardly against the windshield or other forward portions of the interior of the vehicle. Various expedients have been proposed to prevent this injurious forward movement of the occupants of a vehicle. The present invention relates to an apparatus wherein the passenger seat or seats are moved automatically to cradle the occupants thereof and thus overcome or nullify the normal tendency of passengers to be thrown forwardly off the seat and against injury-inflicting obstructions.

More particularly the present invention relates to hydraulic fluid pressure means operable upon impact or collision at the front of the vehicle to rock the vehicle seat rearwardly about a lower transverse pivotal connection before inertia forces throw the passenger forwardly from the seat. This actuation of the vehicle seat is initiated, in the present apparatus, by an actuator disposed forwardly of the conventional vehicle bumper and adapted to come into contact with an obstruction before the conventional vehicle bumper, and thus institute hydraulic fluid operating pressure for pivoting the seat. Arrangements of this general type are found in Krous Patent 2,789,650, dated April 23, 1957, and Racine Patent 2,883,206, dated April 21, 1959, and the present invention comprises an improvement therein.

It is vital and critical in the operation of a safety seat arrangement of this general class that the seat execute its pivotal movement within the shortest possible time, since only a split second is available between the first impact of collision and the time when a passenger will have moved too far forwardly to be safely retained in the seat by the rocking and scooping action of the mechanism of the present invention. Referring particularly to Racine Patent No. 2,883,206, large diameter direct-acting hydraulic columns are established between the forwardly disposed actuator which generates the hydraulic fluid pressure and the seat operating hydraulic motors which raise the forward portion of the seat to pivot the same. This arrangement provides a substantially instantaneous upward movement of the front of the seat and, if the upward cradling movement is to be effective for its intended purpose, the major portion of such movement must occur before inertia forces due to sudden deceleration throw a passenger forwardly from the seat.

The present invention provides means whereby, upon collision or impact, a passenger seat is moved instantaneously upward at its front end about a transverse axis at the lower rear portion of the seat and whereby the entire seat structure moves bodily forward under the force of inertia. The upward pivotal movement of the seat is effected by force means deriving its power from the aforesaid forward member striking an obstruction, in the manner generally illustrated and described in Racine Patent No. 2,883,206, while the accompanying forward movement is entirely under the force of inertia acting against the seat and the load thereon.

While the upward pivotal movement of the seat to cradle the passenger against being thrown therefrom is the primary and fundamental requirement of the apparatus of the present invention, the forward inertia-induced movement thereof contributes importantly to the successful operation of the seat structure to prevent injury to passengers upon collision.

In the first place, the rate of deceleration of a passenger upon collision impact is greatly reduced by the aforesaid forward inertia-induced movement of the seat structure and the shock to the passenger is accordingly greatly reduced. Secondly, the forward inertia-induced movement, which in a preferred form occurs during about the latter one-third of the upward pivotal movement of the seat, allows an additional increment of time for completion of the upward pivotal movement under the force of the aforesaid power means which produces this pivotal movement.

While it is desired that the upward pivotal movement be free from interference by the horizontal sliding movement, the apparatus of the present invention is so arranged that a relationship is established between the upward pivotal movement and the horizontal forward movement whereby the latter, while inertia-induced, is restrained so that the maximum degree of forward movement at any point is controlled or limited by the degree of upward pivotal movement. That is, for every increment of power-operated upward pivotal movement of the seat, a predetermined inertia-induced forward increment is permitted. This limitation of the forward movement does not come into play under normal conditions since the power-operated means imparts upward pivotal movement substantially in advance of the inertia-induced forward movement.

While the inertia-induced forward movement of the seat structure is important and highly desirable, it is principally an adjunct or auxiliary to the upward pivotal movement of the seat since the latter is the movement that effectively cradles the passenger against forward movement. Furthermore, in accordance with the basic arrangement of the safety seat apparatus involved herein, the pivotal movement of the seat is arranged and intended to occur before inertia can act to throw passengers from the seat and obviously a split second sequence of occurrences is involved.

The arrangement of the present invention is such that the inertia-induced forward movement occurs without in any way complicating or retarding or burdening the free upward movement of the front of the seat in the operation of the aforesaid hydraulic force means. That is, all of the motive power applied to the front of the seat structure to raise the same pivotally is available for that primary purpose and is not expended in any degree in producing the horizontal sliding movement of the seat structure.

The following specification and the accompanying drawing set forth a representative practical embodiment of the principles of the present invention by way of example but it is to be understood that the scope of the present invention is not limited to or otherwise than as defined in the appended claims.

Figure 1:
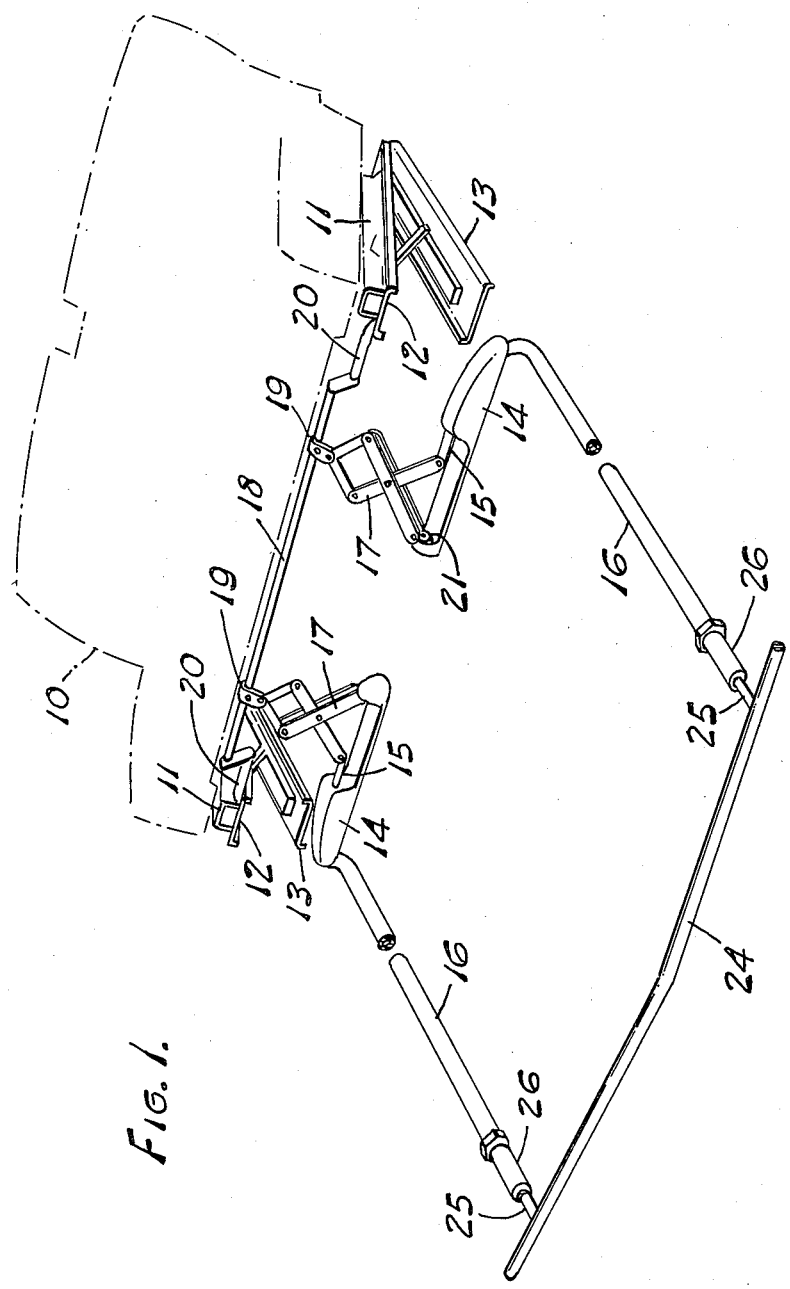
Fig. 1 is a general schematic somewhat skeletonized perspective view of a vehicle seat equipped with one form of the operating structure and apparatus of the present invention.

Throughout the several figures of the drawing like characters of reference denote like parts and, referring to Fig. 1, the numeral 10 indicates in dot and dash lines a conventional vehicle seat which is mounted at opposite sides upon a pair of conventional seat adjusters 11 of the kind normally employed in shifting the seat back and forth and in raising and lowering the same to adjust the position of the seat to suit the operator of the vehicle. These conventional seat adjusters are in turn mounted upon a pair of plate members 12 which are pivoted at their rear ends to permit the front end of the seat 10 to be moved pivotally upward and downward, this pivotal movement being entirely distinct from and independent of the conventional position adjusting movement attained by the adjusters 11.

The manner in which the plate members 12 are movably mounted relative to the vehicle proper will be described in detail in connection with and with reference to Figs. 2 through 5. For present purposes of general orientation and understanding, it is sufficient to consider the seat 10 and the plates 12 as being pivoted at their rear portions for up and down pivotal movement relative to rigid supporting plates 13 which are fixed to the vehicle floor.

The pivotal movement thus briefly referred to is attained by means of a pair of hydraulic cylinders 14 having piston rods 15 which are adapted to be projected toward each other from their respective cylinders 14 upon the application of hydraulic fluid pressure by way of conduits 16 engaging the ends of cylinders 14. The projecting ends of the piston rods 15 connect with lazy tong linkages 17, the upper ends of which are attached to a tie rod 18 as at 19. In the present instance the tie rod 18 is offset downwardly at its opposite ends as at 20 and is fixed to the forward ends of the pivoted plate members 12. For this reason the tie rod does not move forwardly and rearwardly as the seat is adjusted on adjusters 11 but only when upper plate member 12 moves horizontally relative to base plate member 13, as will later appear. The lazy tong linkages 17 are mounted for pivotal movement about the axis of cylinders 14 as at 21 and since the piston rods 15 are similarly rotatable the linkages can act effectively against the tie rod 18 in various forward and rearward positions which the tie rod 18 may assume.

Hydraulic fluid pressure for activating the cylinders 14 through the conduits 16 is developed by an operating bar 24 which is mounted at the front of the motor vehicle in a position somewhat forwardly of the conventional front bumper thereof so that the operating bar engages against an obstruction substantially in advance of the conventional bumper. The operating bar 24 carries a pair of rearwardly extending piston rods 25 which engage in the front ends of cylinders 26 which are in effect mere forward extensions of the fluid conduits 16.

It will therefore be seen that impingement of an object or obstacle against operating bar 24 forcing the same rearwardly will move the piston rods 25 rearwardly in cylinders 26 and thus apply hydraulic operating pressure to the cylinders 14 to raise the front end of seat structure 10 through the cooperation of the lazy tong linkages 17.

This much of the apparatus of the present invention is shown in my prior patent application, Serial No. 677,855, filed August 13, 1957, which is now Patent No. 2,883,206, dated April 21, 1959, and is illustrated schematically in Fig. 1 and described briefly herein merely to show the complete combination of the present invention.

Figure 2:
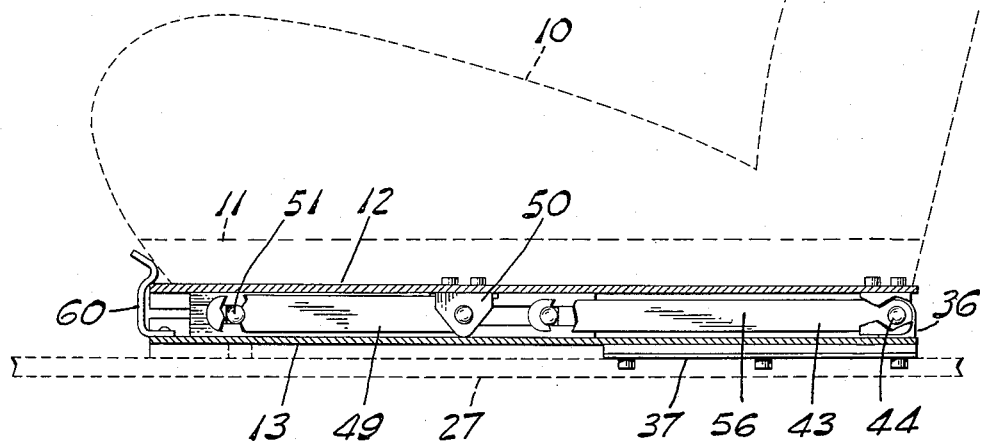
Fig. 2 is a fragmentary side elevational view of the vehicle seat of Fig. 1 showing one form of the safety operating structure thereof partially in longitudinal cross-section.
Figure 3:
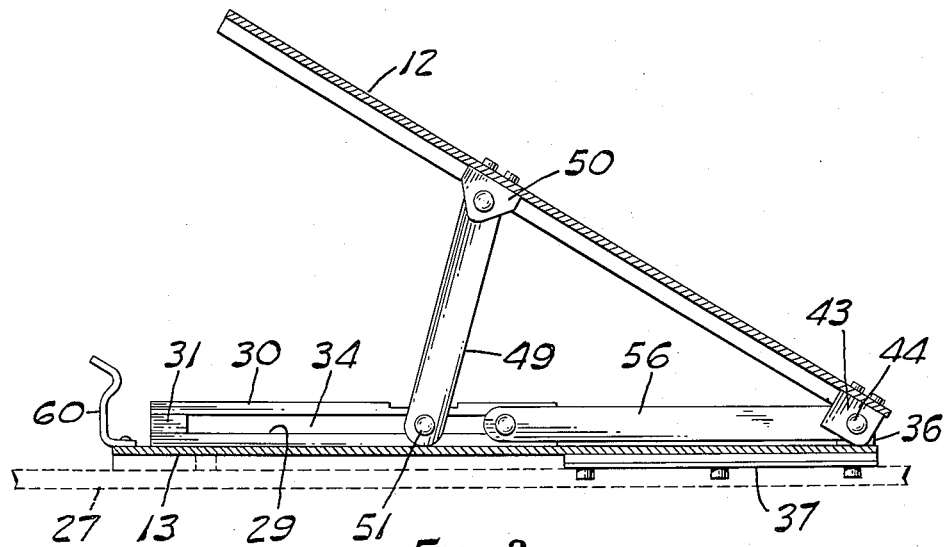
Fig. 3 is a view similar to Fig. 2 but showing the mechanism in the position it occupies when the seat has been substantially fully raised by pivotal movement but before the same has moved forward under inertia forces.
Figure 4:
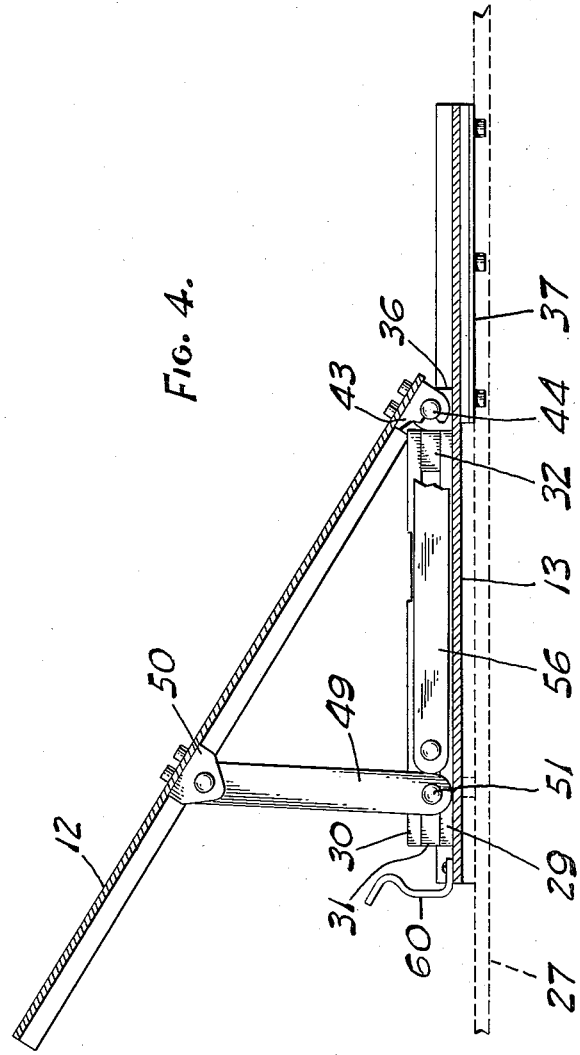
Fig. 4 is a view similar to Fig. 3 but showing the mechanism after the raised seat has moved fully forward under inertia forces.

Reference will now be had to the specific linkage mechanism which is provided between the floor of the vehicle, which is indicated in dash lines in Figs. 2, 3 and 4 of the drawing at 27, and the vehicle seat 10. In this connection it has been noted that the vehicle seat 10 includes at the base portion thereof the usual seat elevating and tilting adjusting means which is employed in conventional vehicle front seats for disposing the seat at a convenient elevation and inclination for a given operator. Also as previously noted, all of this adjusting and tilting mechanism is entirely extraneous to the safety seat operating mechanism of the present invention and is merely indicated schematically at 11 and may, for present purposes, be considered a part of the seat 10.

The portion of the apparatus with which the present invention is immediately concerned comprises the mechanism acting between the fixed base plates 13 secured to the floor of the vehicle and the upper plates 12 which are pivotally and slidably associated with the base plates 13 and upon which the vehicle seat, with its conventional positional adjusting mechanism, is mounted. In the following description reference is had to the left-hand linkange mechanism shown in detail in Figs. 2 through 5 but it will be understood that the right-hand mechanism is identical, but of opposite hand.

Figure 5:
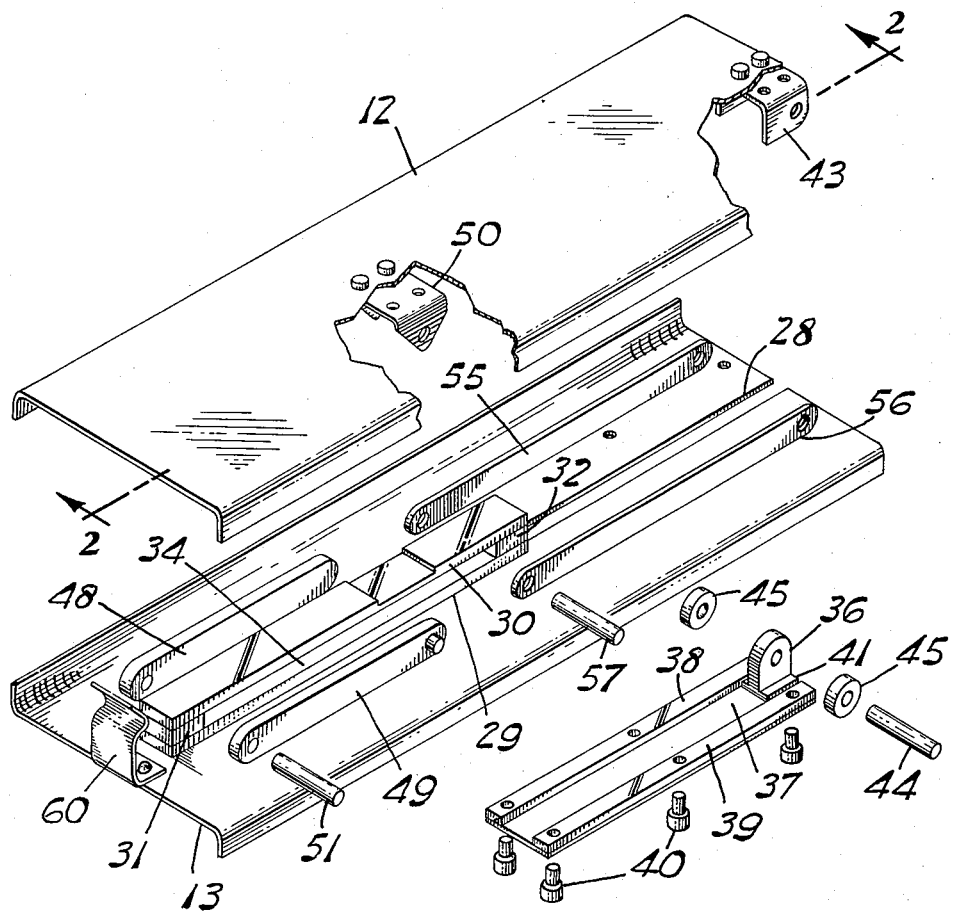
Fig. 5 is an exploded perspective view of the form of seat-supporting and safety-operating mechanism of the present invention which is illustrated in Figs. 2 through 4.

Referring more particularly to Fig. 5 which shows in exploded perspective relationship the mechanism operating between base plate 13 and upper plate 12, the numeral 28 indicates a longitudinal slot beginning at the rear end of base plate 13 and extending to a point medially thereof. Beginning approximately at the forward end of slot 28 there is a longitudinal bar 29 which may be welded or riveted to base plate 13 and a second overlying bar 30 is held in spaced relationship above bar 29 by front and rear spacer blocks 31 and 32.

The bar 30 and spacer blocks 31 and 32 may be rigidly associated with bar 29 by welding or may be riveted thereto in conjunction with the securement of the bar 29 to base plate 13. The assembly of the bars 29 and 30 and spacer blocks 31 and 32 provides a horizontally extending slot which is designated 34.

A bearing block 36 is arranged to slide longitudinally in slot 28 and for this purpose a plate member 37 and a pair of side rails 38 and 39 are fixed to the underside of base plate 13 as by means of rivets 40, the space between the rails 38 and 39 being greater than the width of the slot 28 so as to accommodate an enlarged base portion 41 of bearing block 36 and form, with the slot 28 of base plate 13, a T-slot for guided longitudinal sliding movement of bearing block 36.

An inverted U-shaped bearing bracket 43 is attached to the underside of upper plate 12 at its rear end and a pivot pin 44 passes through the flanges of bearing bracket 43 and through bearing block 36 for pivoting the rear end of upper plate 12 upon longitudinal sliding bearing block 36 about a transverse horizontal axis. The numeral 45 indicates a pair of spacing collars which complete the foregoing pivotal connection.

The forward end of upper plate 12 is adapted to swing upwardly about pivot pin 44 and, for purposes which will presently appear, a forward portion of upper plate 12 is pivotally connected to the rear ends of a pair of links 48 and 49 by means of a bearing bracket 50 fixed to the underside of upper plate 12. The forward ends of links 48 and 49 are arranged for guided horizontal sliding movement in slot 34 by a pivot pin 51 which extends through the forward or lower ends of the links 48 and 49 and through slot 34, the forward ends of the links 48 and 49 being thus free to pivot on the axis of pivot pin 51 and move longitudinally in guided relationship with respect to slot 34.

A pair of horizontal links 55 and 56 are pivoted to the upper plate pivot pin 44 at their rear ends and have a pivot pin 57 extending through their forward ends which rides in the horizontal slot 34 previously described. Accordingly, the links 55 and 56 slide forwardly and rearwardly in a constantly horizontal position with forward and rearward movements of the sliding pivot block 36.

It will be seen from the foregoing that the upper plate 12 may be pivoted upwardly under the motive power of the hydraulic cylinders 14 independently of any forward movement of the pivot block 36, the upper ends of the links 48 and 49 moving upwardly with upper plate 12 while their lower ends and the pivot pin 51 move rearwardly along the slot 34. This phase of movement is illustrated in the raised position of upper plate 12 illustrated in Fig. 3 wherein the upper plate has been moved upwardly by the linkages 17 from the normal or inactive position shown in Fig. 2.

Upon a certain degree of forward inertia movement of the upper plate 12, which occurs independently of the powered raising pivotal movement thereof and carries the pivot block 36 horizontally forwardly therewith, the forward ends of the horizontal links 55 and 56 engage the lower ends of the links 48 and 49 and further forward inertia movement causes the links 55 and 56 to push the links 48 and 49 forwardly so that after the links 48 and 49 have reached a generally upright position the assembly comprising upper plate 12, the links 48 and 49, the pivot block 36, and the horizontal links 55 and 56, moves forward as a rigid unit to the fully forward position of Fig. 4.

Fig. 4 illustrates the relatively rigid positions of the parts referred to in the preceding sentence with respect to each other from the point where the forward ends of the horizontal links 55 and 56 engage against the lower ends of the links 48 and 49. Without the cooperation of horizontal links 55 and 56, forward inertia movement of the upper plate 12 with pivot block 36 would throw the arms 48 and 49 forwardly through an over-center position which would tend to lower the front of the seat and produce an entirely different result from that which is desired.

In practice it has been found that horizontal forward movement of the upper plate 12 by sliding movement of pivot block 36 along lower plate 13 commences after the seat has been moved about two-thirds upwardly in the pivotal movement of upper plate 26 on bearing block 36, so that the positions illustrated in Figs. 2, 3 and 4 aptly illustrate successive phases in the safety seat operation in a general way. Actually, the forward inertia movement overlaps the latter portion of the upward pivotal movement so that, referring to Fig. 3, the links 55 and 56 may have started their forward inertia movement before the links 48 and 49 have moved as far upwardly as illustrated in Fig. 3.

This operational sequence as between the upward and forward movements is very important and underscores the importance of the general underlying mode of operation of the safety seat of the present invention, wherein hydraulic powered raising of the seat structure about its lower rear pivot 44 is initiated and substantially precedes inertia forces on the seat and the passengers which result from the impact of collision.

It is for reasons inherent in the foregoing sequence of forces and movements that safety seat means which depend upon inertia forces for pivoting the seat are inoperative for their intended purpose since the inertia relied upon for pivoting the seat in some prior art structures is at best only simultaneous with the inertia force which throws the passenger from the seat and mechanical frictional forces in seat structures which depend upon inertia operation would usually result in a passenger cradling movement which actually comes after the time when the passenger has already been thrown from the seat.

Furthermore, as pointed out earlier herein, it will be noted from the foregoing description of the mechanism acting between the upper plate 12 and base plate 13 that the power mechanism embodied in the hydraulic cylinders 14 is free to expend its entire force in quickly raising the seat about its rearward pivot and none of the power available for this purpose is expended in the forward movement of the pivot, even though inertia forces are retarded or of insufficient magnitude to produce any or only a very little forward movement of the pivot block 36 and links 55 and 56.

A spring clip 60 is fixed to the front end of base plate 13 and is adapted to engage resiliently over the front edge of upper plate 12 when the latter is in a lowered position, as clearly shown in Fig. 2. Spring clip 60 is so proportioned as to exercise a predetermined degree of resilient restraint against pivotal upward movement of upper plate 12 and this restraint, together with the weight of the seat, prevents inadvertent raising of the seat when relatively light or gradual forces are exerted against the operating member 24 at the front of the vehicle as referred to previously herein. However, due to the resilient nature of member 60 the upper plate 12 may move rapidly upward upon impact forces against operating member 24.

I claim:

1. In a safety seat mechanism for automotive vehicles, a passenger seat member and mounting means disposed beneath said seat member, pivot means engaging said mounting means for free longitudinal sliding movement with respect thereto and attached to the lower rear portion of said seat member for pivotal movement of the latter about a transverse axis, power means adapted to raise the front of the seat member upon collision to pivot the same rearwardly about said pivot means, said pivot means being movable forwardly by inertia of the seat member upon deceleration due to collision of the vehicle, a link member disposed generally horizontally when the seat member is in its normal lowered position with its rear end pivoted to said seat member and its forward end slidably and rotatably engaging said mounting means, whereby said forward end may slide horizontally rearwardly upon upward movement of the front of said seat member, and spacing means extending forwardly from said pivot means and engageable with said slidable forward end of the link member to maintain a predetermined minimum distance between said slidable forward end and said pivot means.

2. In a safety seat mechanism for automotive vehicles, a passenger seat member and mounting means disposed beneath said seat member, pivot means engaging said mounting means for free longitudinal sliding movement with respect thereto and attached to the lower rear portion of said seat member for pivotal movement of the latter about a transverse axis, power means adapted to raise the front of the seat member upon collision to pivot the same rearwardly about said pivot means, said pivot means being movable forwardly by inertia of the seat member upon deceleration due to collision of the vehicle, a link member disposed generally horizontally when the seat member is in its normal lowered position with its rear end pivoted to said seat member and its forward end slidably and rotatably engaging said mounting means, whereby said forward end may slide horizontally rearwardly to permit upward movement of the front of said seat member independently of forward movement of the pivot means, and spacing means extending forwardly from said pivot means and engageable with said slidable forward end of the link member to maintain a predetermined minimum distance between said slidable forward end and said pivot means to prevent overcenter movement of said link member upon forward movement of said pivot means.

3. In a safety seat mechanism for automotive vehicles, a passenger seat member and mounting means disposed beneath said seat member, pivot means engaging said mounting means for free longitudinal sliding movement with respect thereto and attached to the lower rear portion of said seat member for pivotal movement of the latter about a transverse axis, power means adapted to raise the front of the seat member upon collision to pivot the same rearwardly about said pivot means, and means for controlling forward movement of said pivot means under inertia of said seat member relative to upward pivotal movement thereof, said controlling means comprising a link member disposed generally horizontally when the seat member is in its normal lowered position with its rear end pivoted to said seat member and its forward end slidably and rotatably engaging said mounting means, whereby said forward end may move horizontally rearwardly to permit upward movement of the front of said seat member independently of forward movement of the pivot means, and spacing means extending forwardly from said pivot means and engageable with said forward end of the link member to maintain a predetermined minimum distance between said forward end and said pivot means to prevent overcenter movement of said link member upon forward movement of said pivot means.

4. In a safety seat mechanism for automotive vehicles, a passenger seat member and mounting means disposed beneath said seat member, pivot means engaging said mounting means for free longitudinal sliding movement with respect thereto and attached to the lower rear portion of said seat member for pivotal movement of the latter about a transverse axis, power means adapted to raise the front of the seat member upon collision to pivot the same rearwardly about said pivot means, and means for limiting forward movement of said pivot means under inertia of said seat member, said limiting means comprising a link member disposed generally horizontally when the seat member is in its normal lowered position with its rear end pivoted to said seat member and its forward end slidably and rotatably engaging said mounting means, whereby said forward end may move horizontally rearwardly upon upward movement of the front of said seat member, and spacing means extending forwardly from said pivot means and engageable with said forward end of the link member to maintain a predetermined minimum distance between said forward end and said pivot means.

5. In a safety seat mechanism for automotive vehicles, a passenger seat member and mounting means disposed beneath said seat member, pivot means engaging said mounting means for free longitudinal sliding movement with respect thereto and attached to the lower rear portion of said seat member for pivotal movement of the latter about a transverse axis, power means adapted to raise the front of the seat member upon collision to pivot the same rearwardly about said pivot means, said pivot means being movable forwardly by inertia of the seat member upon collision of the vehicle, and means for limiting inertia-induced forward movement of said pivot means, said limiting means comprising a link member disposed generally horizontally when the seat member is in its normal lowered position with its rear end pivoted to said seat member and its forward end slidably and rotatably engaging said mounting means, whereby said forward end may move horizontally rearwardly upon upward movement of the front of said seat member, and spacing means extending forwardly from said pivot means and engageable with said forward end of the link member to maintain a predetermined minimum distance between said forward end and said pivot means.

References Cited in the file of this patent

UNITED STATES PATENTS

| | | |
|---|---|---|
| 2,789,650 | Krous | Apr. 23, 1957 |
| 2,796,112 | Barsky | June 18, 1957 |